F. MESSMER.
Faucets.

No. 152,397. Patented June 23, 1874.

Witnesses:
Chas. F. Meisner.
J. W. Herthel.

Inventor:
Ferdinand Messmer
per.
Herthel & Co.
Attys.

UNITED STATES PATENT OFFICE.

FERDINAND MESSMER, OF ST. LOUIS, MISSOURI.

IMPROVEMENT IN FAUCETS.

Specification forming part of Letters Patent No. 152,397, dated June 23, 1874; application filed April 21, 1874.

*To all whom it may concern:*

Be it known that I, FERDINAND MESSMER, of St. Louis, county of St. Louis and State of Missouri, have invented an Improved Faucet or Cock, of which the following is a specification:

This invention relates to that class of faucets or cocks used for beer-kegs and vessels usually on "tap," into which it is necessary to introduce a current of air to facilitate the "drawing" and better escape of the liquor or fluid contained. This invention consists, first, in providing the body of cock and its shank with a stationary stem, about which is coiled a spring to operate a tubular stem which projects outside of shank; secondly, in combining with the parts aforesaid a flexible hose; thirdly, to the improved combination of air-inlet or tube, operating stems, hose, valve, and float parts, as will hereinafter more fully appear.

Figure 1:
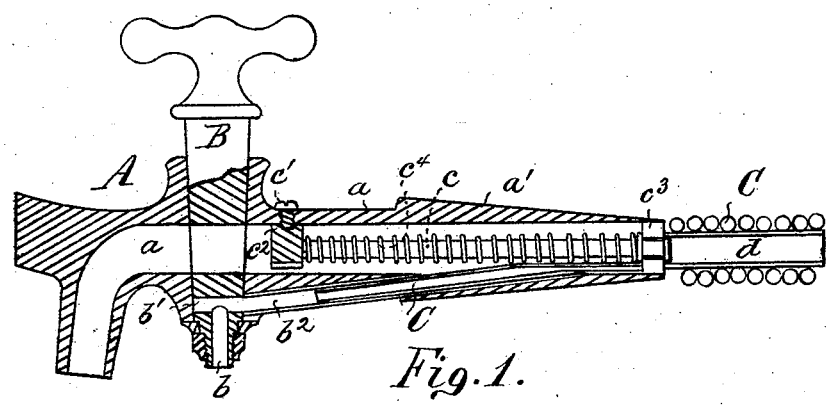
Figure 2:
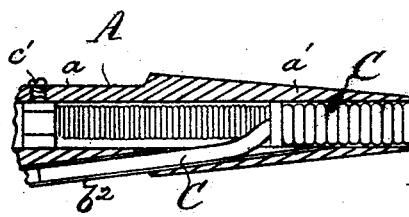
Figure 4:
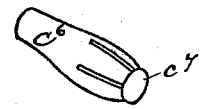
Figure 3:
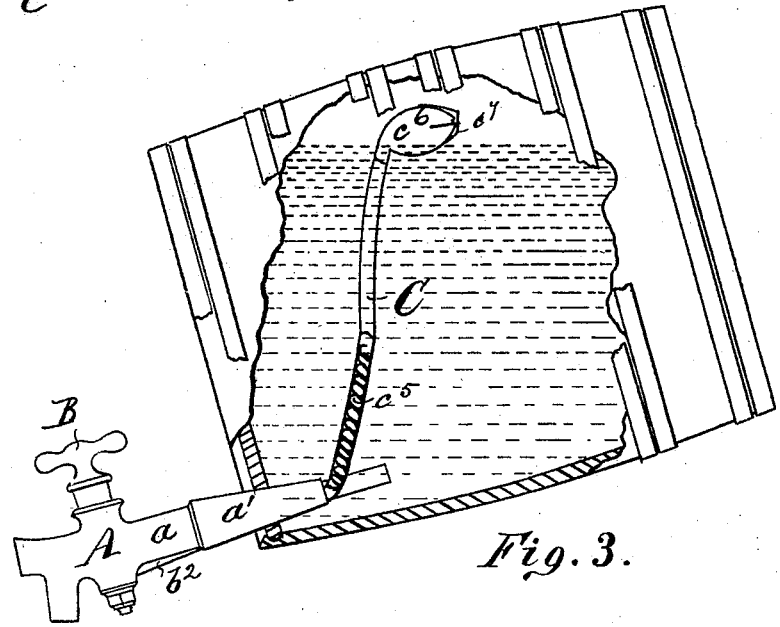

In the drawing, Figure 1 is a sectional elevation, showing the connection of the hose to its inlet-tube, and the outer part of said hose coiled around the tubular stem. Fig. 2 is a part sectional elevation, showing the coiled hose together with its tubular stem placed inside of the shank of cock, preparatory to applying same to a keg or vessel. Fig. 3 shows my improved faucet or cock when applied and used for a beer-keg; also showing the coil-spring in the hose; Fig. 4 being a detail of float, showing its valve.

A represents a cock or faucet, $a$ its body, $a'$ its shank, B its T-handle, all of ordinary construction. The T-handle B has its screw-stem provided with an inlet-passage, $b$. This joins a further air-passage, $b^1$, in said handle, as shown in Fig. 1. In line to communicate with the air-passage $b^1$, I provide or form part of the body $a$ of cock an air-tube, $b^2$. (See figures.) The air-tube $b^2$ extends to the inner line of the shank $a'$. To the outer end of the tube $b^2$ I connect in any proper manner one end of a rubber or similar flexible hose, C. The length of the hose C required will be such as to reach by its extreme outer end the top surface of the contents of the vessel to which it is applied. In order to introduce and cause the hose C to reach the top of the contents of the vessel, and introduce air in same, as stated to be in the nature of this invention, I provide within the body $a$ and shank $a'$ of the cock a rod or stem, $c$. This is secured stationary by a set-screw, $c^1$, engaging the inner head $c^2$, as shown in Fig. 1. The inner head $c^2$, as well as outer head $c^3$, are perforated, or have open spaces, to allow for the passage of the liquid through and out of cock. To the outer end of the stem $c$ is a tubular stem, $d$, which projects outside of the shank $a'$. (See Figs. 1 and 3.) The object of the tubular stem $d$ is to permit for the remaining outer part of hose C to be wound or coiled about it, as shown in Figs. 1 and 2. Also, the object of the stem $d$ is to introduce the coiled hose inside of the shank of cock, as shown in Fig. 2. Hence I provide the stationary stem $c$ with a coil-spring, $c^4$. (See Figs. 1 and 2.) This spring $c^4$ permits the operator to push or place the projecting stem $d$ and its coiled hose C inside the shank, as indicated in Fig. 2; and also, by its tension, said spring $c^4$ forces said inserted parts out of said shank, as shown in Figs. 1 and 3. In order that the hose C may uncoil itself from its stem $d$, I provide a coil-spring, $c^5$, (see Fig. 3,) inside of said hose. To the extreme outer end of hose C, I provide a tip or float, $c^6$, (see Fig. 3,) the object thereof being to remain on top and float on the surface of the liquid matter. The tip or float $c^6$ has a rubber valve, $c^7$, as shown in Figs. 3 and 4. Said valve, by its side strips, is secured to the float so as to cover the opening of same, and thus by means of said valve only the air is permitted to escape out of the opening of float, and the closing action of said valve prevents any undue matter entering said opening of float.

The operation of the parts is therefore as follows: The hose C being coiled about the projecting stem $d$, the operator forces or pushes said stem and hose inside the shank $a'$, as shown in Fig. 2. In this condition the faucet or cock is applied and secured to the keg or vessel used. This done, the coil-spring $c^4$ forces the tubular stem $d$ with its hose out to its original position; also at same time the hose C, by means of its spring $c^5$, uncoils and loosens itself from its said stem $d$. This accomplished, the air causes the loosened hose to rise above the surface of the liquid matter, and there remain by virtue of its float $c^6$ floating at top, as indicated in Fig. 3. Thus a direct air communication is established through the cock or faucet and its hose to the surface of the contents of the vessel. This air communication can be controlled by the turning on and shutting off motions of the handle of cock.

What I claim is—

1. The combination of the tubular stem $d$, heads $c^2$ $c^3$, stationary stem $c$ having spring $c^4$, with faucet A, to operate as and for the purpose set forth.

2. The combination of the stem $c$, having spring $c^4$, tubular stem $d$, flexible hose C, and faucet A, having tube $b^2$, and air-inlet $b$, to operate as set forth.

3. The combination of the stem $c$, its spring $c^4$, tubular stem $d$, heads $c^2$ $c^3$, flexible hose C, having spring $c^5$, float $c^6$, valve $c^7$, and faucet A, having air-inlet $b$, and air-tube $b^2$, to operate as and for the purpose set forth.

In testimony of said invention I have hereunto set my hand.

FERDINAND MESSMER.

Witnesses:
WILLIAM W. HERTHEL,
CHAS. F. MEISNER.